United States Patent
Kubota et al.

(10) Patent No.: US 6,938,638 B2
(45) Date of Patent: Sep. 6, 2005

(54) GAS CIRCULATING-PROCESSING APPARATUS

(75) Inventors: Hiroshi Kubota, Yokohama (JP); Rempei Nakata, Kamakura (JP); Naruhiko Kaji, Kamakura (JP); Itsuko Sakai, Yokohama (JP); Takashi Yoda, Machida (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 456 days.

(21) Appl. No.: 10/026,566

(22) Filed: Dec. 27, 2001

(65) Prior Publication Data

US 2002/0134429 A1 Sep. 26, 2002

(30) Foreign Application Priority Data

Dec. 28, 2000 (JP) .................................. 2000-400833
Dec. 28, 2000 (JP) .................................. 2000-401179
Dec. 28, 2000 (JP) .................................. 2000-401180

(51) Int. Cl.$^7$ .................... B08B 5/00; B08B 9/027; F17D 1/04; H01L 21/00
(52) U.S. Cl. ............... 137/240; 118/715; 134/1.1; 134/1.2; 134/1.3; 134/22.1; 134/22.11; 137/12; 137/14; 137/15.04; 137/238; 137/341; 137/563; 137/565.23; 137/565.3; 156/345.26; 156/345.29; 156/345.33; 156/345.37; 438/905; 438/906
(58) Field of Search .................. 134/22.1, 22.11, 134/34, 37, 1.1, 1.2, 1.3; 118/715; 137/7, 238, 12, 14, 15.04, 15.05, 563, 565.23, 565.3, 341, 240; 156/345.15, 345.24, 345.26, 345.29, 345.33, 354.37, 345.52, 345.11, 345.18; 216/59, 84; 438/906, 909, 905

(56) References Cited

U.S. PATENT DOCUMENTS 4,816,113 A * 3/1989 Yamazaki ................... 118/728
6,110,542 A * 8/2000 Miyanaga et al. .......... 427/577
6,206,970 B1 * 3/2001 Atwell ....................... 118/715
6,374,833 B1 * 4/2002 Yuan et al. .................. 134/1.1
6,410,408 B1 * 6/2002 Yano .......................... 438/484
6,660,342 B1 * 12/2003 Miyanaga et al. .......... 427/571
6,689,699 B2 * 2/2004 Sakai et al. ................. 438/710
6,782,907 B2 * 8/2004 Kawasaki et al. ............. 137/2
2002/0034880 A1 * 3/2002 Sakai et al. ................. 438/710

FOREIGN PATENT DOCUMENTS

JP          6-327924       11/1994
JP          9-251981        9/1997
JP         10-122178        5/1998

OTHER PUBLICATIONS

Itsuko Sakai et al., "Semiconductor Processing Apparatus and Method for Manufacturing a Semiconductor Device", U.S. Appl. No. 09/955,083, filed Sep. 19, 2001.
Masashi Saito et al., "Processing Apparatus", U.S. Appl. No. 09/686,370, filed Oct. 12, 2000.

* cited by examiner

Primary Examiner—George L. Walton
(74) Attorney, Agent, or Firm—Finnegan, Henderson, Farabow, Garrett & Dunner, L.L.P.

(57) ABSTRACT

A gas-circulating processing apparatus which comprises a processing chamber, a gas feeding piping, a gas supply piping, a first exhaust mechanism discharging a gas from the processing chamber, a second exhaust mechanism discharging a portion of a gas discharged from the first exhaust mechanism, a back pressure adjusting mechanism interposed between the first exhaust mechanism and the second exhaust mechanism to adjust a back pressure of the first exhaust mechanism, and a gas circulating piping which is configured to combine another portion of the gas that has been discharged from the first exhaust mechanism with a processing gas supplied from the gas supply piping, wherein the gas feeding piping has a larger inner diameter than that of the gas supply, or the processing gas is introduced into the first exhaust mechanism, or a first heater is provided to heat at least part of the circulating route.

20 Claims, 7 Drawing Sheets

GAS CIRCULATING-PROCESSING APPARATUS

CROSS-REFERENCE TO RELATED APPLICATIONS

This application is based upon and claims the benefit of priority from the prior Japanese Patent Applications No. 2000-400833, filed Dec. 28, 2000; No. 2000-401179, filed Dec. 28, 2000; and No. 2000-401180, filed Dec. 28, 2000, the entire contents of all of which are incorporated herein by reference.

BACKGROUND OF THE INVENTION

1. Field of the Invention

The present invention relates to a gas-circulating processing apparatus for circulating and recycling a processing gas, and to a gas circulating and processing method.

2. Description of the Related Art

Cleaning gases such as $CF_4$, $C_2F_6$, $NF_3$, etc. to be employed for cleaning a chamber such as a CVD device are known as a global warming gas, so that the employment and discharge of these gas are required to be reduced as minimum as possible. In this case, a method of circulating the gas is effective in minimizing the quantity of employment and discharging of gas. As for the system for circulating and recycling the gas, there is proposed a method as set forth for example in Jpn. Pat. Appln. KOKAI Publication No. 9-251981 wherein a processing gas is circulated so as to recycle it for use in a film-forming treatment or in an etching treatment.

In the gas-circulating system as mentioned above, a processing gas (a recycling gas) from a circulating route is designed to be combined with another processing gas from an ordinary gas supply route (the gas to be supplied from the ordinary gas source), and the resultant processing gas thus combined is introduced through a confluent gas route into a chamber. In this case, in order to supply a processing gas effectively from the circulating route as well as from the ordinary gas supply route, it is important to minimize the pressure of confluent gas flow so as to increase as much as possible a pressure difference between the back pressure of a gas circulating exhaust unit (to be interposed between the chamber and the ordinary main exhaust unit) and the pressure of confluent gas flow.

In the prior art however, the aforementioned viewpoints have not been sufficiently taken into consideration with regard to the conductance of the piping (or piping) of each of the routes, so that it has been difficult to lower the pressure of confluent gas flow. When the pressure of confluent gas flow is high, the back pressure of the gas circulating exhaust unit is required to be increased, thereby making it difficult to miniaturize the gas circulating exhaust unit. When the gas circulating exhaust unit is large in size, the location for installing the gas circulating exhaust unit would be restricted, and the circulating route for the gas circulating exhaust unit would become longer. As a result, the time for circulating the gas would become longer, thus deteriorating the gas-circulating efficiency.

As described above, although a gas circulating system for circulating and recycling a processing gas has already been proposed in the past, the gas circulating system is constructed without sufficiently taking the aspects of the diameter of piping into consideration. As a result, it has been difficult to efficiently feed a processing gas to a chamber, etc.

Furthermore, when the aforementioned gas-circulating method is adopted, the processing gas that has been activated in a chamber (active species) is also permitted to enter into the gas circulating exhaust unit (for example, a turbomolecular pump). Because of this, the gas in the exhaust unit is required to be purged by diluting the interior of the exhaust unit with a non-corrosive gas so as to prevent the interior of the exhaust unit from being corroded by the active species. Therefore, a large quantity of an inert gas such as $N_2$ is required to be introduced into the exhaust unit in addition to the aforementioned processing gas to be employed for cleaning the chamber. However, when the cleaning is performed by circulating a gas at a high circulation rate, the partial pressure of the cleaning processing gas is caused to lower with time, thus deteriorating the cleaning efficiency.

Jpn. Pat. Appln. KOKAI Publication No. 10-122178 describes a method wherein an inert gas is directly introduced as a purging gas into the gas circulating exhaust unit so as to prevent the interior of the exhaust unit from being corroded. However, even with this method, a large quantity of the inert gas that has been introduced into the gas circulating exhaust unit is permitted to enter into the circulating routes together with the processing gas. As a result, the processing gas to be introduced into the chamber is diluted and the partial pressure of the processing gas is lowered, thus also making it difficult to avoid the problem that the cleaning efficiency is caused to deteriorate.

As mentioned above, although a method of introducing, as a purging gas, an inert gas into the gas circulating exhaust unit has been proposed for the purpose of preventing the interior of the gas circulating exhaust unit from being corroded, the processing gas to be recycled into the chamber through circulating routes is caused to be diluted by the inert gas, thus raising the problem that the cleaning efficiency is caused to deteriorate.

On the other hand, when the aforementioned gas-circulating method is adopted, a by-product such as $SiO_2$ for instance is also permitted to circulate, thus generating the particles thereof. Due to the generating of particles of by-product, the circulating piping and the interior of chamber are soiled, raising a problem.

It may be possible to minimize the number of particles thus adhered by etching the by-products adhered to the inner surface of the circulating piping by prolonging the cleaning time. However, in that case, the quantity of processing gas such as $C_2F_6$ would be increased, thus resulting on the contrary in the obstruction of the merit of the gas circulating method, i.e. the effects thereof to minimize the quantity of employment and discharging of gas.

There is also proposed a method wherein a filter is inserted in a circulation line for the purpose of suppressing the circulation of the by-products (for example, Jpn. Pat. Appln. KOKAI Publication No. 9-251981). However, since the conductance of the circulation line is deteriorated by the provision of the filter, the load of the gas circulating apparatus would be increased, thereby raising the problem that it becomes difficult to lower the power consumption of the gas circulating apparatus and to miniaturize the apparatus. Additionally, if the filter is clogged, the conductance of the circulation line is caused to fluctuate, thereby fluctuating the processing characteristic of the circulating apparatus. There is also a problem that the maintenance of the filter such as the exchange of filter is additionally required.

As explained above, although a gas circulating system for circulating and recycling a processing gas has already been proposed in the past, due to the particles of the by-product that will be generated in the process of forming a film or in the cleaning process, there is still a problem that the circulating piping, etc. are likely to be soiled by the particles.

BRIEF SUMMARY OF THE INVENTION

According to a first aspect of the present invention, there is provided a gas-circulating processing apparatus which comprises:

a processing chamber in which processing is performed;

a gas supply piping communicated with a processing gas source;

a first exhaust mechanism discharging a gas from the processing chamber;

a second exhaust mechanism discharging a portion of the gas discharged from the first exhaust mechanism;

a back pressure adjusting mechanism interposed between the first exhaust mechanism and the second exhaust mechanism to adjust a back pressure of the first exhaust mechanism;

a gas circulating piping which is configured to combine another portion of the gas that has been discharged from the first exhaust mechanism with a processing gas supplied from the gas supply piping; and a gas feeding piping connected with a confluence zone where the processing gas from the gas supply piping is combined with the gas from the gas circulating piping to form a confluent gas, the gas feeding piping functioning to introduce the confluent gas into the processing chamber and having a larger inner diameter than that of the gas supply piping in the vicinity of the confluence zone.

According to a second aspect of the present invention, there is also provided a as-circulating processing apparatus which comprises:

a processing chamber in which processing is performed by making use of an activated gas obtained by activating a processing gas;

a gas feeding piping introducing the processing gas into the processing chamber;

a first exhaust mechanism discharging a gas from the processing chamber;

a first gas supply piping feeding the processing gas to the first exhaust mechanism;

a second exhaust mechanism discharging a portion of the gas discharged from the first exhaust mechanism;

a back pressure adjusting mechanism interposed between the first exhaust mechanism and the second exhaust mechanism to adjust a back pressure of the first exhaust mechanism; and a gas circulating piping connected with the gas feeding piping to feed the processing gas supplied from the first gas supply piping as well as another portion of the gas discharged from the first exhaust mechanism to the processing chamber through the gas feeding piping.

According to a third aspect of the present invention, there is also provided a gas-circulating processing method comprising feeding a processing gas to a gas-circulating processing apparatus which comprises:

a processing chamber in which processing is performed by making use of an activated gas obtained by activating a processing gas;

a gas feeding piping introducing the processing gas into the processing chamber;

a first exhaust mechanism discharging a gas from the processing chamber;

a second exhaust mechanism discharging a portion of the gas discharged from the first exhaust mechanism;

a back pressure adjusting mechanism interposed between the first exhaust mechanism and the second exhaust mechanism to adjust a back pressure of the first exhaust mechanism; and a gas circulating piping connected with the gas feeding piping to feed another portion of the gas discharged from the first exhaust mechanism to the processing chamber through the gas feeding piping, wherein the processing gas is supplied to the first exhaust mechanism, thereby purging the gas in the first exhaust mechanism, and parts of the processing gas and the purged gas are introduced into the processing chamber through the gas circulating piping and the gas feeding piping.

According to a fourth aspect of the present invention, there is provided a gas-circulating processing apparatus which comprises:

a processing chamber in which processing is performed;

a first exhaust mechanism discharging a gas from the processing chamber;

a second exhaust mechanism discharging a portion of the gas discharged from the first exhaust mechanism through an exhaust piping interposed therebetween;

a back pressure adjusting mechanism interposed between the first exhaust mechanism and the second exhaust mechanism to adjust a back pressure of the first exhaust mechanism;

a gas circulating piping feeding another portion of the gas discharged from the first exhaust mechanism to the processing chamber; and a first heater heating at least part of a circulating route extending from the processing chamber through the first exhaust mechanism and the gas circulating piping to the processing chamber.

DETAILED DESCRIPTION OF THE INVENTION

In the gas-circulating processing apparatus according to the first aspect of the embodiments of the present invention, part of the processing gas discharged from the first exhaust mechanism is led through the gas circulating piping and is combined with the processing gas which is fed from the gas supply piping, and the combined gases are fed to the processing chamber through the gas feeding piping. In this case, the inner diameter of the gas feeding piping is enlarged larger than the inner diameter of the gas supply piping in the vicinity of the gas confluence point.

Namely, in the gas-circulating processing apparatus according to the first aspect of the embodiments of the present invention, the inner diameter of this portion of the gas feeding piping may preferably be at least 1.5 times larger than the inner diameter of the gas supply piping. More preferably, the inner diameter of this portion of the gas feeding piping may be 1.5–4.0 times larger than the inner diameter of the gas supply piping.

Additionally, a portion of the gas circulating piping may preferably be larger in diameter than the gas supply piping in the vicinity of the gas confluence point. In this case, the inner diameter of this portion of the gas circulating piping may preferably be at least 1.5 times larger than the inner diameter of the gas supply piping. More preferably, the inner diameter of this portion of the gas circulating piping may be 1.5–4.0 times larger than the inner diameter of the gas supply piping.

When the inner diameter of the gas feeding piping is made larger than the inner diameter of the gas supply piping, the conductance of the gas feeding piping can be made larger than the conductance of the gas supply piping. As a result, the pressure at the gas confluence point can be lowered, thus making it possible to effectively introduce the processing gas into the gas feeding piping from the gas supply piping.

Further, when the inner diameter of the gas circulating piping is made larger than the inner diameter of the gas supply piping, the conductance of the gas circulating piping can be made larger than the conductance of the gas supply piping. As a result, the gas flow from the gas circulating piping to the gas supply piping can be prohibited, thus making it possible to promote the processing gas flow from the gas circulating piping to the gas feeding piping. As a result, it would become possible to effectively introduce the processing gas into the gas feeding piping from the gas circulating piping.

As explained above, in the gas-circulating processing apparatus according to the first aspect of the embodiments of the present invention, it is possible to effectively introduce the processing gas into the gas feeding piping from the gas supply piping and from the gas circulating piping, thereby making it possible to improve the efficiency of gas circulation and to reduce the quantity of gas to be employed.

In the gas-circulating processing apparatus and the method of circulating and processing gas according respectively to the second and third aspects of the embodiments of the present invention, the first gas supply piping is connected with the first exhaust mechanism to thereby enable the processing gas to be supplied to the first exhaust mechanism through the first gas supply piping. In this case, the processing gas supplied from the first gas supply piping can be utilized as a purging gas for purging the corrosive exhaust gas discharged from the processing chamber in the first exhaust mechanism.

Namely, the processing gas to be supplied from the first gas supply piping is permitted to enter into the gas circulating piping together with the exhaust gas and is then introduced into the processing chamber through the gas feeding piping communicated with the gas circulating piping while enabling the corrosive exhaust gas discharged from the processing chamber to be purged in the first exhaust mechanism. In this case, the exhaust gas is recycled and circulated.

In the gas-circulating processing apparatus and the method of circulating and processing gas according respectively to the second and third aspects of the present invention, the fresh processing gas to be introduced into the processing chamber so as to be used for processing therein may be only the processing gas supplied from the first gas supply piping. Alternatively, the fresh processing gas to be introduced into the processing chamber so as to be used for processing therein may be a combination of gases, i.e. the processing gas supplied from the first gas supply piping, and the processing gas supplied from the second gas supply piping connected with the gas feeding pipe.

In this case, the first gas supply piping may be connected with a first processing gas source, while the second gas supply piping may be connected with a second processing gas source. Alternatively, both of these first gas supply piping and second gas supply piping may be branched from the same single processing gas source. In either cases, the processing gas supplied from the first gas supply piping and the processing gas supplied from the second gas supply piping are combined at the junction between the gas circulating piping and the second gas supply piping before they are introduced into the processing chamber through the gas feeding piping.

As explained above, in the gas-circulating processing apparatus and the method of circulating and processing gas according respectively to the second and third aspects of the embodiments of the present invention, the processing gas is enabled to function as a purging gas, so that the problem that will be raised when only inert gas is employed as a purging gas as in the case of prior art, i.e. the problem that the partial pressure of processing gas is lowered by the inert gas (the dilution of the processing gas) can be overcome, thereby making it possible to enhance the efficiency of a predetermined processing such as the cleaning of apparatus.

In the gas-circulating processing apparatus according to the fourth aspect of the embodiments of the present invention, there is provided a heater for heating at least part of circulating route extending from the processing chamber, through the first exhaust mechanism and the gas circulating piping, to the processing chamber.

In this case, at least part of the circulating route may preferably be heated to a temperature of not lower than 60° C. It is also preferable that at least part of the circulating route may be heated to a temperature of not higher than 100° C.

In the gas-circulating processing apparatus according to the fourth aspect of the embodiments of the present invention, it is also preferable to provide it with a second heater for heating the back pressure adjusting mechanism and a portion of the piping which is branched from the gas circulating piping and extends to the back pressure adjusting mechanism. In this case also, the temperature of the piping heated by this second heater may preferably be not lower than 60° C. but not higher than 100° C.

As mentioned above, according to the prior art, the by-products generated in a step such as a film-forming step are permitted to adhere onto the inner wall of gas circulating piping for instance to thereby contaminate the apparatus. Whereas according to the fourth aspect of the embodiments of the present invention, since the circulating route of gas is heated, the etching efficiency of the processing gas functioning as a cleaning gas can be improved, thereby making it possible to effectively remove the contaminating materials adhered onto the inner wall of gas circulating piping, etc.

The gas-circulating processing apparatus and the gas-circulating processing method according to the aforementioned first through fourth aspects of the embodiments of the present invention are applicable to a CVD device to be employed for forming a film in a film-forming chamber, as well as to an etching device for performing the etching of a substance to be etched in an etching chamber, thereby enabling the deposition or etching of film to be performed efficiently.

In particular, when the gas-circulating processing apparatus and the gas-circulating processing method according to the embodiments of the present invention is applied to the cleaning treatment of the film-forming chamber of CVD apparatus, especially excellent effects can be achieved.

Next, various embodiments of the present invention will be explained as follows with reference to drawings.

Figure 1:
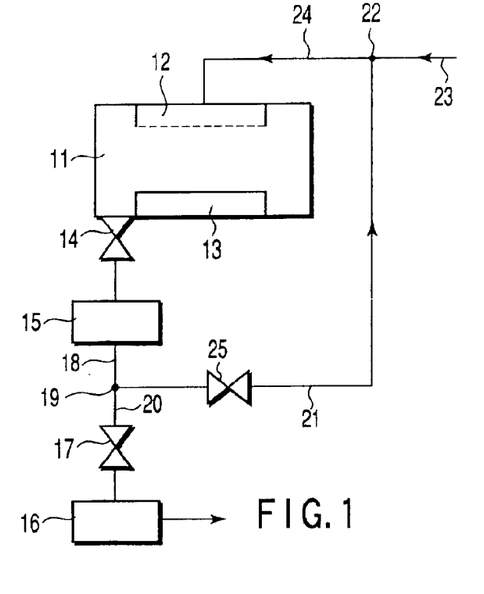
FIG. 1 is a diagram illustrating one example of the gas circulating system according to a first embodiment of the present invention.

FIG. 1 is a diagram illustrating one example of the structure of gas circulating system according to a first embodiment of the present invention. In the following explanations, the cleaning process in a parallel-plate type plasma CVD apparatus will be exemplified.

Referring to FIG. 1, a chamber 11 is provided therein with an upper electrode 12 functioning not only as a shower head but also as a high-frequency electrode, and with a lower electrode 13 having a heater and a wafer transporting mechanism. The deposition of a film on the surface of substrate (such as a semiconductor wafer) mounted on the lower electrode 13, or the cleaning of the interior of chamber can be executed by activating the processing gas by means of electric discharge to be generated between the upper electrode 12 and the lower electrode 13.

As for the processing gas to be employed in the cleaning of the interior of chamber, it is possible to employ a gas comprising a fluorine-containing gas and/or an oxygen-containing gas. Specific examples of such a processing gas include $CF_4$, $C_2F_6$, $C_3F_8$, $C_4F_{10}$, $C_5F_8O$, $F_2$, $NF_3$, $O_2$, etc. A mixed gas comprising two of more kinds of these gases may be also employed. Further, an inert gas such as $N_2$ or Ar may be incorporated in these processing gases.

For example, a mixed gas comprising $C_2F_6$, $O_2$ and $N_2$ may be preferably employed as a processing gas.

By making use of a cleaning gas which can be obtained through the activation of any of these processing gases, a silicon oxide film ($SiO_2$ film) adhered onto the interior of the chamber 11 can be etched away.

By the way, if the present invention is to be applied to an etching device for performing the etching of a wafer for instance inside the chamber 11, the same kinds of gas as described above can be employed. However, in the case where the present invention is to be applied to a CVD device for performing the deposition of a film on a wafer for instance inside the chamber 11, silane, disilane, tetraethoxysilane (TEOS), etc. can be employed as a processing gas.

The chamber 11 is connected with a pressure-adjusting valve 14, so that the pressure inside the chamber 11 can be maintained approximately constant by the adjustment of the opening degree of the valve 14.

The chamber 11 is connected, through the gas outlet end thereof, with a gas circulating exhaust unit 15 with which an exhaust unit 16 for discharging the gas outside the system is connected. As for the exhaust unit 15, a turbo-molecular pump or a Roots pump can be employed. As for the exhaust unit 16, a dry pump can be employed.

A back-pressure adjusting valve 17 for the exhaust unit 15 is interposed between the exhaust unit 15 and the exhaust unit 16. A piping 18 disposed on the gas outlet side of the exhaust unit 15 is diverged at the branch point 19 thereof into a piping 20 communicated with the exhaust unit 16 and a gas circulating piping 21, so that the ratio of gas to be circulated relative to the quantity of gas to be discharged by the exhaust unit 15, i.e. gas circulating ratio, can be controlled by adjusting the opening degree of the back-pressure adjusting valve 17. By the way, in the case where the deposition of film is to be performed inside the chamber 11, the back-pressure adjusting valve 17 is controlled so as to be fully opened.

Since the gas circulating piping 21 is connected at a confluence point 22 with a gas supply piping 23 and also with a gas feeding piping 24, the processing gas being fed from the gas circulating piping 21 (the processing gas to be recycled) is enabled to combine with the processing gas to be fed from the gas supply piping 23 (the processing gas to be supplied from the ordinary gas source) at the confluence point 22, the resultant mixed processing gas being introduced via the gas feeding piping 24 into the chamber 11. A valve 25 (for example, stop valve) is installed at a midway of the gas circulating piping 21 so as to enable the back-pressure of the gas circulating exhaust unit 15 to be set higher than the pressure of gas confluence point 22 under the condition where this valve 25 is opened during the circulation of gas. By the way, during the film-forming process, the valve 25 is kept closed.

Figure 2:
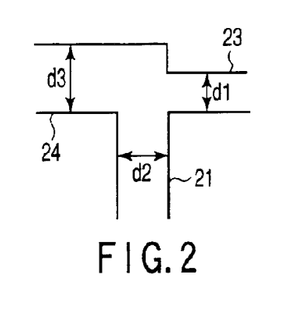
FIG. 2 is a diagram illustrating the diameter of each of pipings in the vicinity of gas confluence point of the gas circulating system shown in FIG. 1.

FIG. 2 illustrates the inner diameter of each of pipings in the vicinity of the gas confluence point 22 (the junction of pipings) shown in FIG. 1. As shown in FIG. 2, the relationships among these inner diameters are set in this embodiment to "d1<d2<d3", wherein d1 denotes the inner diameter of the gas supply piping 23, d2 denotes the inner diameter of the gas circulating piping 21, and d3 denotes the inner diameter of the gas feeding piping 24.

The relationships among these inner diameters of these pipings should be set so as to secure at least "d1<d3", more preferably to secure "d1<d2". Further, as for the ratio between d1 and d3, it is preferable to secure "d3≧1.5×d1", while as for the ratio between d1 and d2, it is preferable to secure "d2≧1.5×d1".

When the diameter of each of the pipings is set to as described above, and at the same time, when the conductance of each of the pipings is set to satisfy the similar relationships, the pressure of the confluence point can be easily lowered, thereby enabling the processing gas to be efficiently introduced into the gas feeding piping 24 from the gas circulating piping 21 as well as from the gas supply piping 23.

By the way, as long as the aforementioned relationships among these inner diameters of piping are satisfied at least at the region in the vicinity of the gas confluence point 22, i.e. at least at the region where these piping are connected with each other, the processing gas can be efficiently introduced into the gas feeding piping 24 as mentioned above. Therefore, even if the inner diameter of each of the piping is uniform throughout the length thereof, or even if the inner diameter of each of the piping is partially varied along the length thereof, the same effects as mentioned above can be secured as long as the relationships among the conductances of these piping are set so as to secure at least "C1<C3", more preferably to secure "C1<C2", wherein C1 denotes the conductance of the gas supply piping 23, C2 denotes the conductance of the gas circulating piping 21, and C3 denotes the conductance of the gas feeding piping 24.

The following Table 1 shows the pressures of the confluence point 22 relative to the inner diameter d1 of the gas supply piping 23, to the inner diameter d2 of the gas circulating piping 21, and to the inner diameter d3 of the gas feeding piping 24 under the conditions of: 2000 sccm in the circulating gas flow rate and 5 Torr in the inner pressure of the chamber. As seen from this Table 1, when the inner diameters of pipings are set so as to meet the aforementioned relationships, the pressures of the confluence point 22 can be lowered as compared with the case where the aforementioned relationships are not satisfied (where these inner diameters are set to d1=¼, d2=½, and d3=¼).

TABLE 1

| d1 (inch) | d2 (inch) | d3 (inch) | Pressures of confluence point (Torr) |
|---|---|---|---|
| ¼ | ½ | ¼ | 21 |
| ¼ | ⅜ | ⅜ | 15 |
| ¼ | ½ | ⅜ | 11 |
| ¼ | ⅜ | ½ | 10 |
| ¼ | ½ | ½ | 9 |

As for the method of enhancing the gas circulating efficiency, it is conceivable to adopt a method to shorten the circulation route by miniaturizing the circulating exhaust unit and by directly mounting the miniaturized circulating exhaust unit on the chamber. However, when the exhaust unit is miniaturized, the back pressure tends to be decreased, and the lower limit of the back pressure of an exhaust unit that can be directly mounted on the chamber is at most 20 Torr or so at present. However, when the inner diameters of these pipings are confined to meet the aforementioned relationships, the pressure of the confluence point can be lowered to a sufficient degree, so that even if a relatively small circulating exhaust unit exhibiting a lower back pressure is employed, it is still possible to secure a sufficient difference in pressure between the back pressure of the exhaust unit and the pressure of the confluence point. Therefore, it becomes possible to shorten the circulation route by miniaturizing the circulating exhaust unit, thereby making it possible to enhance the circulation efficiency, to reduce the circulation time, and to reduce the quantity of gas to be employed.

Figure 3:
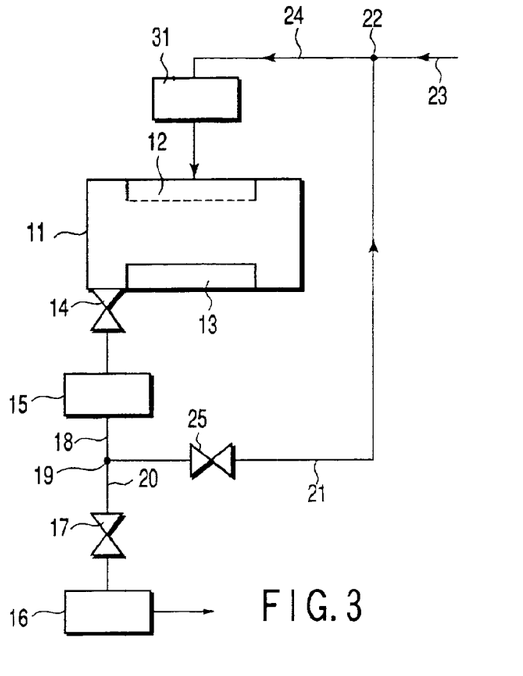
FIG. 3 is a diagram illustrating a modified example of the gas circulating system according to a first embodiment of the present invention.

FIG. 3 is a diagram illustrating a modified example of the gas circulating system according to a first embodiment of the present invention. The basic structure thereof is the same as that of the gas circulating system shown in FIG. 1. Therefore, the constituent components corresponding to the constituent components shown in FIG. 1 are represented by the same reference numbers as those of FIG. 1, thereby omitting the detailed explanations thereof.

The embodiment shown in FIG. 1 is directed to a CVD apparatus wherein the cleaning of the interior of chamber is executed by making use of the activated processing gas that has been activated in the chamber. Whereas, this modified embodiment is directed to a CVD apparatus which is capable of performing a down-flow type cleaning, wherein the cleaning of the interior of chamber is executed by introducing therein the activated processing gas that has been activated outside the chamber. Namely, as shown in FIG. 3, a processing gas is introduced into an activating zone 31 (for example, a cavity which is capable of generating microwaves) from the gas feeding piping 24, the processing gas thus activated in the activating zone 31 being subsequently introduced into the chamber 11.

In this modified embodiment also, the relationships among the inner diameter d1 of the gas supply piping 23, the inner diameter d2 of the gas circulating piping 21, and the inner diameter d3 of the gas feeding piping 24 are set to the same as those of the embodiment shown in FIG. 1, thereby making it possible to obtain the same effects as obtainable in the embodiment shown in FIG. 1.

The embodiments described above are related to the cleaning of the interior of chamber by making use of a cleaning gas as a processing gas. However, the present invention is also applicable likewise to film forming processing by making use of a film forming gas as a processing gas. Furthermore, the present invention is also applicable likewise to an etching device wherein an etching gas is employed as the processing gas.

Figure 4:
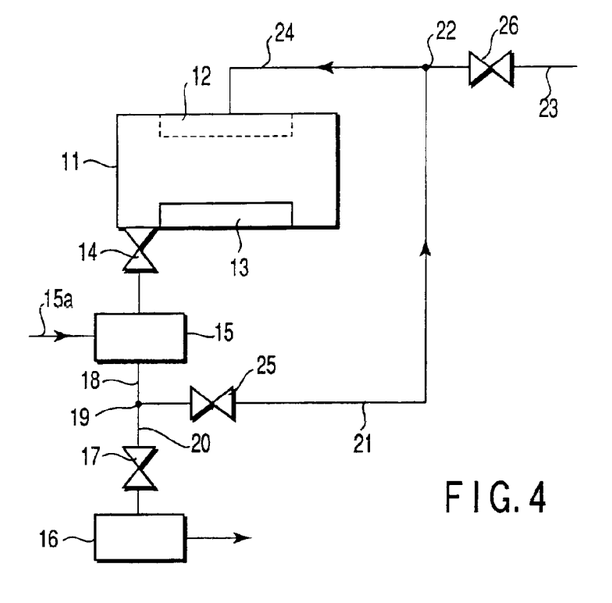
FIG. 4 is a diagram illustrating one example of the gas circulating system according to a second embodiment of the present invention.

FIG. 4 is a diagram illustrating one example of the structure of gas circulating system according to a second embodiment of the present invention.

The basic structure thereof is the same as that of the gas circulating system shown in FIG. 1. Therefore, the constituent components corresponding to the constituent components shown in FIG. 1 are represented by the same reference numbers as those of FIG. 1, thereby omitting the detailed explanations thereof.

The features of the system shown in FIG. 4 which differ from the embodiment shown in FIG. 1 are that a gas supply piping 15a is connected with the exhaust unit 15 so as to enable a processing gas, etc. to be introduced into the exhaust unit 15 from this gas supply piping 15a, and that a valve 26 is installed in the vicinity of the confluence point 22 of the gas supply piping 23 so as to enable a processing gas to be supplied from this gas supply piping 23 if necessary. Namely, under the condition where the valve 26 is closed, only the processing gas from the gas circulating piping 21 is permitted to enter into the chamber 11 from the gas feeding piping 24. Whereas, under the condition where the valve 26 is opened, the processing gas from the gas circulating piping 21 is permitted to combine with the processing gas to be fed from the gas supply piping 23 at the confluence point 22, the resultant mixed gas being allowed to enter into the chamber 11 from the gas feeding piping 24. A valve 25 is installed at a midway of the gas circulating piping 21 so as to enable the back-pressure of the gas circulating exhaust unit 15 to be set higher than the pressure of gas confluence point 22 under the condition where this valve 25 is opened during the circulation of gas.

By the way, in the case where only the processing gas from the gas circulating piping 21 is employed in processing in the processing chamber 11, the gas supply piping 23 may not be installed, and hence the gas circulating piping 21 is connected continuously with the gas feeding piping 24.

Figure 5:
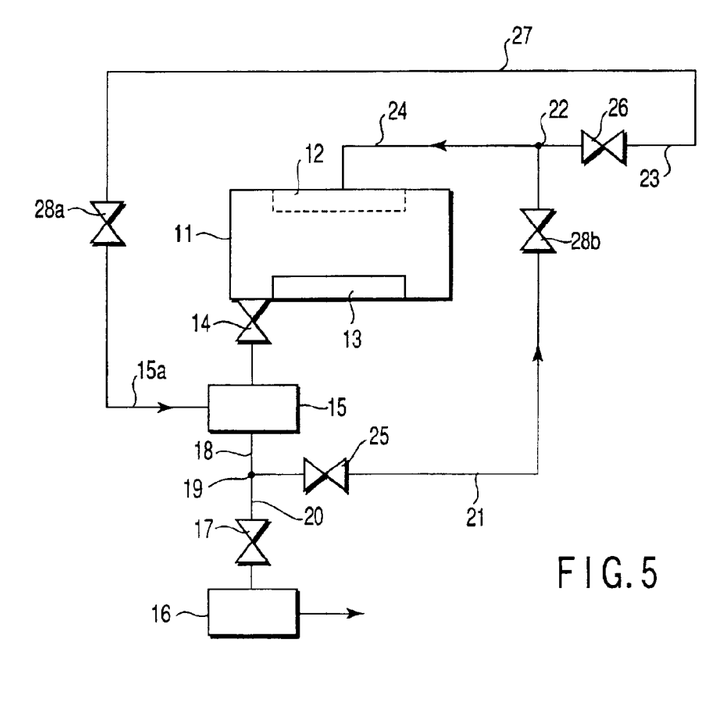
FIG. 5 is a diagram illustrating a modified example of the gas circulating system according to a second embodiment of the present invention.

Alternatively, as shown in FIG. 5, the upstream side of the gas supply piping 23 (the foreside of the valve 26) may be diverged, wherein the branched piping 27 is connected via a predetermined valve 28a with the gas supply piping 15a, and a predetermined valve 28b is installed at a midway of the gas circulating piping 21 which is located in the vicinity of the confluence point 22. When the circulation of gas is to be performed in this structure, the valve 26 is closed and valves 28a and 28b are opened so as to enable all of fresh processing gas to be supplied via the gas supply piping 15a from the exhaust unit 15. Further, in the case when the circulation of gas is not to be performed, the valve 26 is opened and valves 28a and 28b are closed so as to enable all of fresh processing gas to be introduced via the gas supply piping 23 into the chamber 11. By the way, in the latter case, a purging gas such as $N_2$ gas may be introduced into the exhaust unit 15 from the gas supply piping 15a.

According to this system constructed as described above, the interference of pressure between the fresh gas supply route and the gas circulating route can be prevented, thereby making it possible to simplify the structure of the gas feeding zone to the chamber. Furthermore, the circulation of gas can be performed without inviting the decrease in pressure of the processing gas, and at the same time, making it possible to prevent the deterioration of the exhaust unit.

Figure 6:
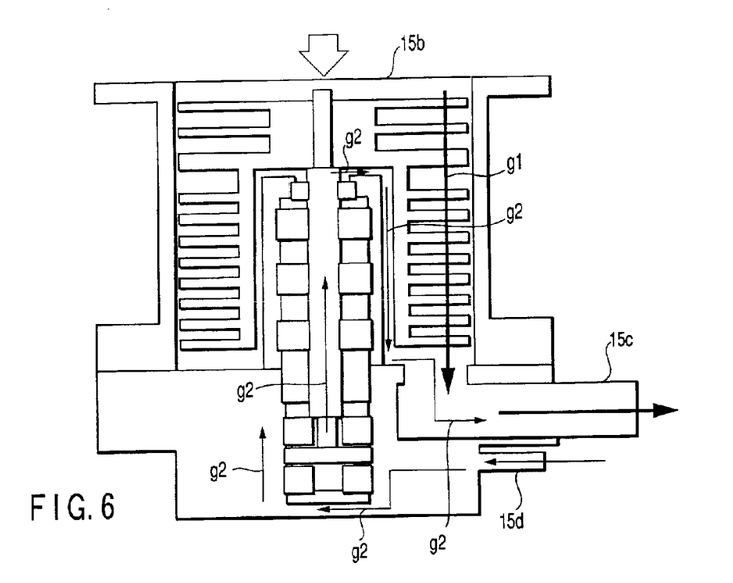
FIG. 6 is a schematic view illustrating a turbo-molecular pump employed in a gas circulating system shown in FIG. 4.

FIG. 6 is a schematic view illustrating one example of a turbo-molecular pump employed as an exhaust unit 15. The gas discharged from the chamber 11 is permitted to be introduced into the turbomolecular pump from a main feeding port 15b and then discharged via a route g1 and an outlet port 15c toward the piping 18. Further, a processing gas is fed via the gas supply piping 15a to a purging gas inlet port 15d, and discharged via a route g2 to the piping 18 from the outlet port 15c.

The processing gas for cleaning such as $CF_4$, $C_2F_6$, $C_3F_8$, $NF_3$, $O_2$, etc. as mentioned above tends to become corrosive through the activation thereof by means of plasma. However, since these processing gases would not be dissociated by ordinary thermal energy, it is not considered that these processing gases would cause the corrosion of the exhaust unit 15. Therefore, these processing gases can be employed as a purging gas (as a diluent gas) for the exhaust unit 15. With this viewpoint, according to this embodiment, the processing gas for cleaning is directly introduced into the exhaust unit 15 from the inlet port 15d, thereby utilizing this gas as a purging gas.

Figure 7:
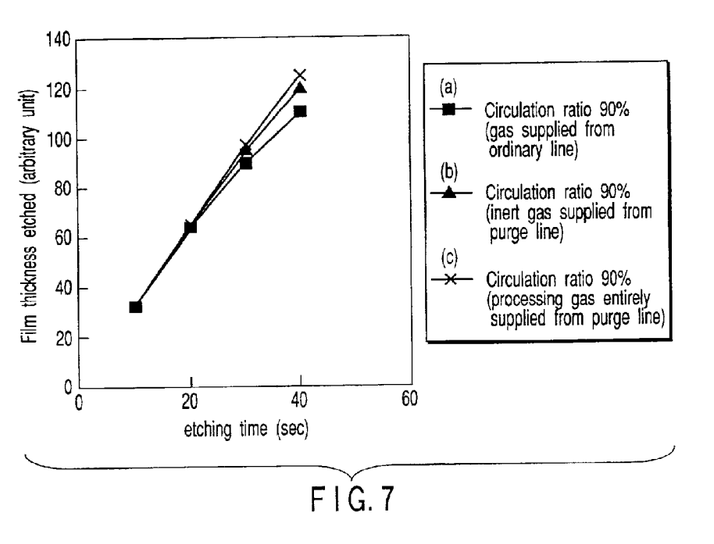
FIG. 7 is a graph illustrating a relationship between the etching time and the etched thickness of film in the case where the gas circulating system according to a second embodiment of the present invention was employed.

FIG. 7 is a graph showing the results obtained from the investigation of the film thickness etched in the etching performed in the chamber 11, which was executed in the case (a) wherein an inert gas is supplied together with a processing gas from the ordinary gas supply piping 23; the case (b) wherein a processing gas is supplied from the gas supply piping 23 and at the same time, only an inert gas is supplied from the purging gas supply piping 15a; and the case (c) wherein all of the processing gases for cleaning are supplied from the purging gas supply piping 15a.

In the case (b) wherein an inert gas is supplied from the purging gas supply piping 15a, although the etching rate was found improved as compared with the case (a), the partial pressure of the processing gas was lowered (the processing gas was diluted) by a large quantity of the inert gas supplied from the gas supply piping 15a, so that it was found difficult to enhance the etching rate (cleaning rate). Whereas in the case (c) according to this embodiment, since the processing gas for cleaning is supplied as a purging gas from the gas supply piping 15a, the lowering of the partial pressure of the processing gas due to the inert gas was prevented, thereby making it possible to enhance the etching rate (cleaning rate).

By the way, as far as the cleaning efficiency is concerned, all of the processing gas should preferably be introduced into the exhaust unit 15 from the purging gas supply piping 15a. However, if all of the processing gas is supplied from the purging gas supply piping 15a, an excessive load would be imposed on the exhaust unit to thereby occasionally obstructing the operation of the exhaust unit. In this case, the processing gas may be supplied from both of the gas supply piping 15a and the gas supply piping 23. In this case also, the cleaning efficiency can be improved in the same manner as in the case where all of the processing gas is supplied from the gas supply piping 15a.

The embodiments described above are related to the cleaning of the interior of chamber by making use of a cleaning gas as a processing gas. However, the present invention is also applicable likewise to film forming processing by making use of a film forming gas as a processing gas. Furthermore, the present invention is also applicable likewise to an etching device wherein an etching gas is employed as the processing gas.

Figure 8:
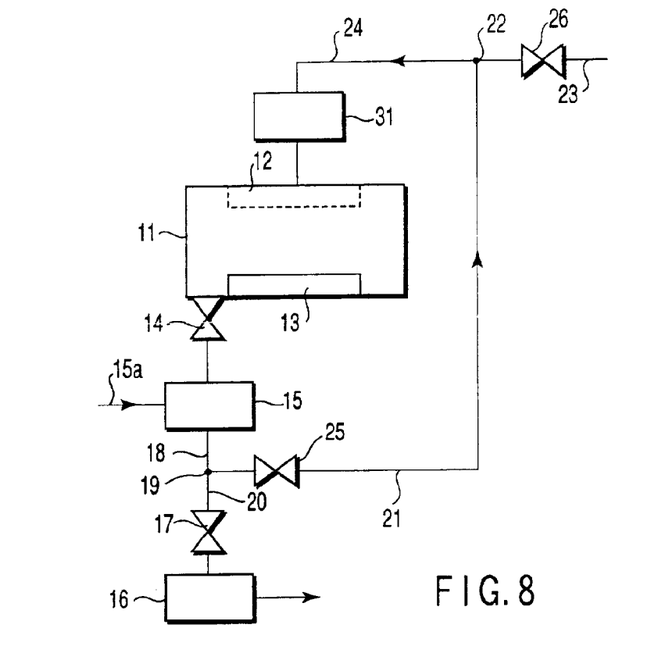
FIG. 8 is a diagram illustrating another modified example of the gas circulating system according to a second embodiment of the present invention.

FIG. 8 is a diagram illustrating a modified example of the gas circulating system shown in FIG. 4. The basic structure thereof is the same as that of the gas circulating system shown in FIG. 4. Therefore, the constituent components corresponding to the constituent components shown in FIG. 4 are represented by the same reference numbers as those of FIG. 4, thereby omitting the detailed explanations thereof.

The embodiment shown in FIG. 4 is directed to a CVD apparatus wherein the processing gas is activated in the chamber. Whereas, this modified embodiment is directed to a CVD apparatus which is capable of performing a down-flow type cleaning, wherein the processing gas is activated outside the chamber. Namely, in this embodiment also, all or part of the processing gas is introduced into the exhaust unit 15 from the purging gas supply piping 15a as in the embodiment shown in FIG. 4, thereby making it possible to obtain the same effects as in the embodiment shown in FIG. 4.

The embodiments described above are related to the cleaning of the interior of chamber by making use of a cleaning gas as a processing gas. However, the present invention is also applicable likewise to film forming processing by making use of a film forming gas as a processing gas. Furthermore, the present invention is also applicable likewise to an etching device wherein an etching gas is employed as the processing gas.

Figure 9:
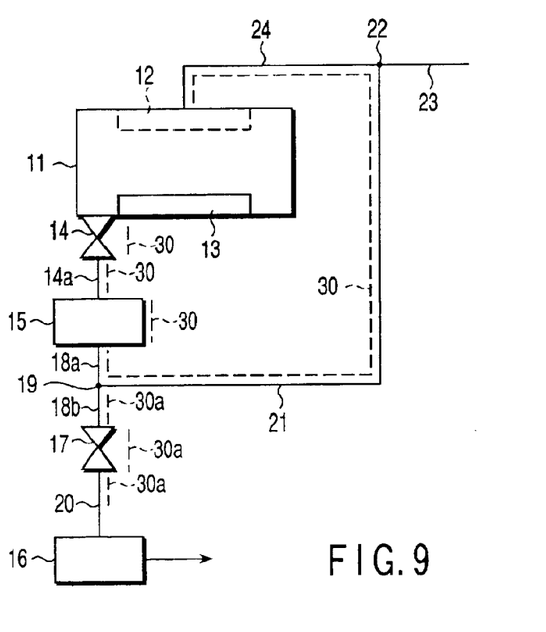
FIG. 9 is a diagram illustrating one example of the gas circulating system according to a third embodiment of the present invention.

FIG. 9 is a diagram illustrating one example of the structure of gas circulating system according to a third embodiment of the present invention.

The basic structure thereof is the same as that of the gas circulating system shown in FIG. 1. Therefore, the constituent components corresponding to the constituent components shown in FIG. 1 are represented by the same reference numbers as those of FIG. 1, thereby omitting the detailed explanations thereof.

The features of the system shown in FIG. 9 which differ from the embodiment shown in FIG. 1 are that the valve 25 is not provided in the gas circulating piping 21, and that a heater 30 (for example, a tape heater) is provided so as to heat the route extending from the gas outlet portion of the chamber to the gas feeding portion. Namely, all of the pressure adjusting valve 14, the piping 14a, the exhaust unit 15, the piping 18a, the gas circulating piping 21 and the gas feeding piping 24 are designed to be heated by the heater 30. However, all of these circulation routes are not required to be heated. Namely, at least part of the circulating routes (for example, only each of the pipings within the circulating route) may be selectively heated.

Further, a heater 30a is provided so as to heat the components located outside the circulating routes such as the piping 18b, the back-pressure adjusting valve 17 and the piping 20. However, as far as the piping 20 is concerned, the heating thereof may be designed such that only a predetermined length thereof which is located in the vicinity of the back-pressure adjusting valve 17 can be heated.

By making use of the apparatus shown in FIG. 9, the relationship between the temperature of piping and the etching rate was investigated under the conditions wherein the circulating routes are heated by the heater 30 and an $SiO_2$ film-deposited test piece was mounted inside the gas circulating piping 21. The results of the measurement thus obtained are shown in FIG. 10.

Figure 10:
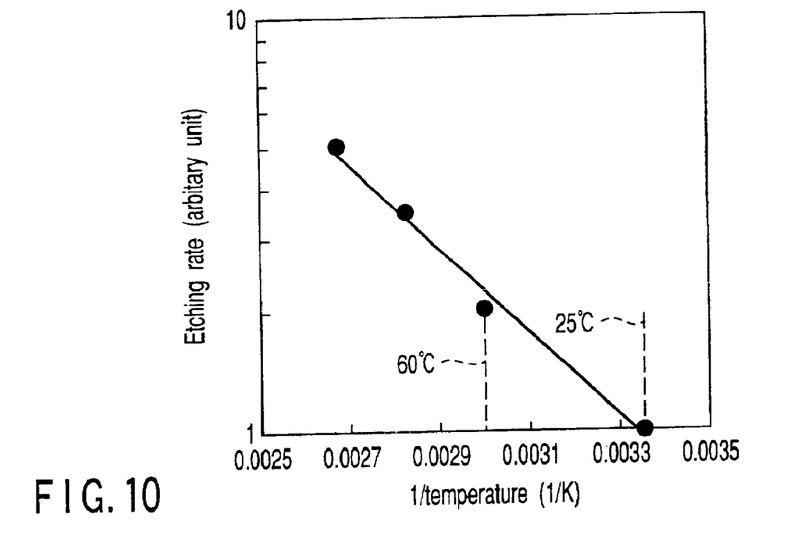
FIG. 10 is a graph illustrating a relationship between the heating temperature and the etching rate in the case where the gas circulating system according to a third embodiment of the present invention was employed.

As shown in FIG. 10, when the circulating routes were heated up to a temperature of 60° C. or more, an etching rate which was twice as fast as that obtainable in room temperature (25° C.) was achieved. In this case, active fluorine generated by the plasma is considered to be consumed in the cleaning of the interior of the chamber. As a matter of fact however, the active fluorine was found effective also in the etching of the adsorbed matters which were adhered on the inner surface of piping after the entering thereof in the piping, so that by raising the temperature of the piping, etc., the etching effect thereof was considered to be enhanced.

Then, by making use of TEOS as a raw material gas, a silicon oxide film ($SiO_2$) was formed on the surface of wafer by means of plasma CVD method. After the wafer is transferred out of the chamber, a cleaning gas consisting of $C_2F_6$, $O_2$ and $N_2$ are introduced into the chamber at a flow rate of 80 sccm, respectively. Then, these gases are exhausted, and part of the exhaust gases was permitted to circulate at a recycling ratio of 80%. The number of particles adhered onto the inner wall of chamber upon finishing this cleaning process was found several hundreds, which level is intolerable for practical use. This may be attributed to the fact that since a film-forming gas as well as the decomposed substances thereof were permitted to enter into the circulating piping also, a by-product such as $SiO_2$ was permitted to adhere on the inner wall of the circulating piping, so that this by-product is permitted to enter, in the form of particles, into the chamber together with the circulating processing gas.

Further, when the cleaning rate was measured by changing the circulating ratio of the cleaning gas, the degree of deteriorating the cleaning rate was relatively minimal as long as the circulating ratio of the cleaning gas was confined to not more than about 80%. However, the degree of deteriorating the cleaning rate was found prominent when the circulating ratio of the cleaning gas was increased to 90%. This may be attributed to the influence of $SiF_4$ which was a by-product of etching.

On the other hand, when the circulating routes were heated to 60° C. by means of the heater 30, and a film-forming process was performed by means of plasma CVD method using TEOS as a raw material gas, followed by a cleaning treatment, the generation of particles was found greatly reduced as compared with the conventional method without raising any problem in practical viewpoint.

By the way, as far as the cleaning rate is concerned, it is preferable that the heating temperature is as high as possible. However, in view of the deterioration of the O-ring to be employed at various portions of the circulating routes, the heating temperature should preferably be confined to not higher than 100° C. However, where a metal gasket is to be employed, the heating temperature may be raised higher than 100° C.

Additionally, with a view to remove the adsorbed matters deposited on the downstream portion in the gas exhaust route, the piping 18b, the back-pressure adjusting valve 17 and part of the piping 20 (a 50 cm-long portion thereof which is located on the back-pressure adjusting valve 17 side) were also heated to a temperature of 60° C. As a result, the adsorbed matters located at these heated portions could be etched away, thereby making it possible to prevent the generation of back flow due to the scattering of particles on the occasion of pressure changes, thus minimizing the generation of particles.

Figure 11:
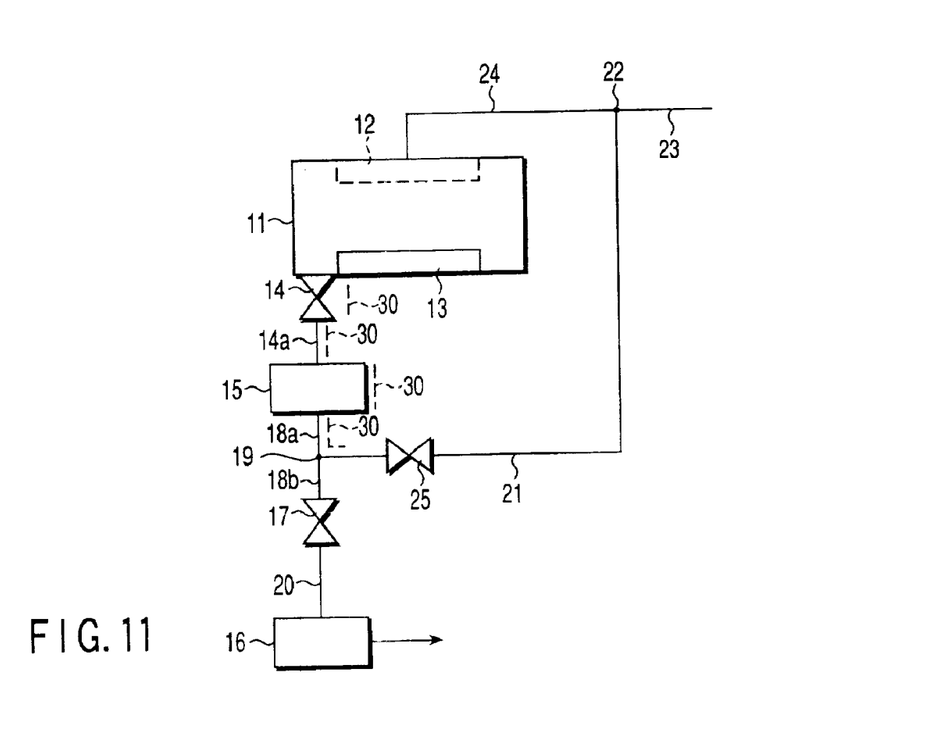
FIG. 11 is a diagram illustrating a modified example of the gas circulating system according to a third embodiment of the present invention.

FIG. 11 is a diagram illustrating a modified example of the gas circulating system shown in FIG. 9. The basic structure thereof is the same as that of the gas circulating system shown in FIG. 9. Therefore, the constituent components corresponding to the constituent components shown in FIG. 9 are represented by the same reference numbers as those of FIG. 9, thereby omitting the detailed explanations thereof.

This modified embodiment is featured in that a stop valve 25 is installed at a midway of the gas circulating piping 21, which is located in the vicinity of the confluence point 19. This stop valve 25 is closed on the occasion of performing the deposition of film inside the chamber 11, but is opened on the occasion of cleaning process. When the stop valve 25 is provided in this manner, the inflow of the film-forming gas into the gas circulating piping 21 can be prevented during the step of forming a film, and hence the deposition of by-product on the inner wall of the gas circulating piping 21 can be prevented.

As described above, when the stop valve 25 is provided in this manner, the deposition of by-product on the circulating route located on the rear side of the stop valve 25 can be greatly inhibited. Therefore, even if only a portion of the circulating route located on the fore side (on the upstream side) of the stop valve 25 is heated by means of the heater 30, the effect of minimizing the generation of particles can be sufficiently secured. Especially, in the case where the main body of CVD device and the exhaust unit are installed at different stories, respectively, the length of piping to be heated can be advantageously shortened.

By the way, even if the stop valve 25 is installed, there is a possibility that the particles are allowed to enter from the upstream side of the circulating route on the occasion of initiating the circulation of gas, so that the stop valve 25 and a portion of the circulating route located on the rear side of the stop valve 25 should preferably be concurrently heated. Namely, it is preferable that the circulating route is entirely heated as in the case of the embodiment shown in FIG. 9. Further, in the same manner as in the case of the embodiment shown in FIG. 9, the piping 18b, the back-pressure adjusting valve 17 and part of the piping 20 should preferably be also heated concurrently.

Figure 12:
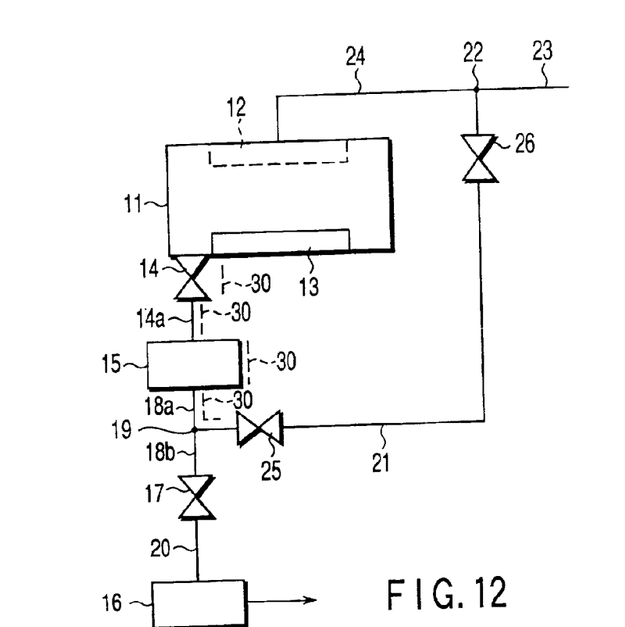
FIG. 12 is a diagram illustrating another modified example of the gas circulating system according to a third embodiment of the present invention.

FIG. 12 is a diagram illustrating a modified example of the gas circulating system shown in FIG. 11. The basic structure thereof is the same as that of the gas circulating system shown in FIG. 11. Therefore, the constituent components corresponding to the constituent components shown in FIG. 11 are represented by the same reference numbers as those of FIG. 11, thereby omitting the detailed explanations thereof.

This modified embodiment is featured in that, in addition to the structure shown in FIG. 11, a stop valve 26 is additionally installed at a midway of the gas circulating piping 21, which is located in the vicinity of the confluence point 22. This stop valve 26 is controlled such that it is kept closed until the pressure difference between the back-pressure of the exhaust unit 15 and the pressure of the confluence point 22 is increased up to a predetermined value or more in the cleaning process, but is opened when this pressure difference is increased higher than the predetermined value. When the stop valve 26 is provided in this manner, the back flow of the film-forming gas into the gas circulating piping 21 from the gas supply piping 23 can be prevented, and hence the deposition of by-product on the gas circulating piping 21 can be prevented more effectively.

By the way, in the same manner as in the case of the embodiment shown in FIG. 9, it is preferable that the circulating route is entirely heated as in the case of the embodiment shown in FIG. 9, and additionally, the piping 18b, the back-pressure adjusting valve 17 and part of the piping 20 should preferably be also heated concurrently.

Figure 13:
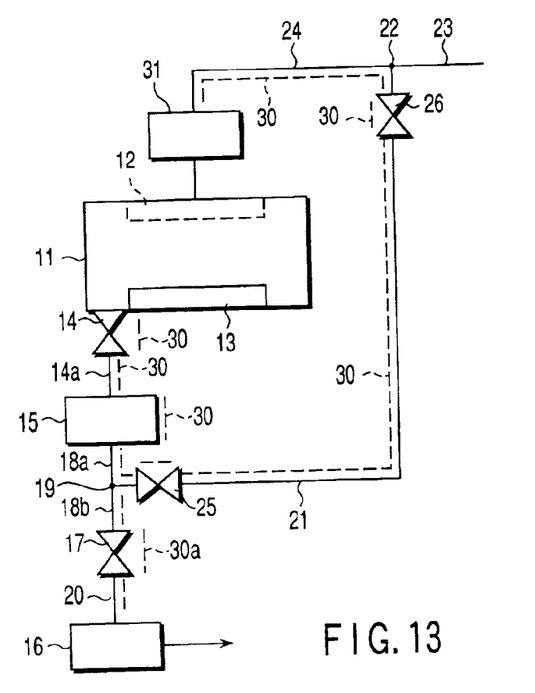
FIG. 13 is a diagram illustrating still another modified example of the gas circulating system according to a third embodiment of the present invention.

FIG. 13 is a diagram illustrating a modified example of the gas circulating systems shown in FIGS. 9, 11 and 12. The basic structure thereof is the same as that of the gas circulating system shown in FIG. 9 for instance. Therefore, the constituent components corresponding to the constituent components shown in FIG. 9 for instance are represented by the same reference numbers as those of FIG. 9 for instance, thereby omitting the detailed explanations thereof.

The embodiment shown in FIG. 9 is directed to a CVD apparatus wherein the activation of the processing gas is executed inside the chamber. Whereas, this modified embodiment is directed to a down-flow type CVD apparatus, wherein the activation of the processing gas is executed outside the chamber. Namely, as shown in FIG. 13, a processing gas is introduced into an activating zone 31 (for example, a cavity which is capable of generating microwaves) from the gas feeding piping 24, the processing gas thus activated in the activating zone 31 being subsequently introduced into the chamber 11.

In this modified embodiment also, as in the case of the embodiment shown in FIG. 9, at least part of the circulating route is heated by means of the heater 30. However, the circulating route according to this embodiment denotes the route extending from the gas outlet portion of the chamber 11 to the gas feeding portion of the activating zone 31. A desired portion of this circulating route is heated by the heater 30. As in the case of the embodiment shown in FIG. 9, the piping 18b, the back-pressure adjusting valve 17 and part of the piping 20, all of which are located outside the circulating route, may be further heated by means of the heater 30a.

By the way, although the embodiment shown in FIG. 13 sets forth a structure provided with the stop valves 25 and 26, these stop valves 25 and 26 may be omitted as in the case of the embodiment shown in FIG. 9, or only the stop valve 25 may be installed as in the case of the embodiment shown in FIG. 11. In the case where only the stop valve 25 is installed, even if only a portion of the circulating route located on the fore side of the stop valve 25 is heated by means of the heater 30, the effect of minimizing the generation of particles can be sufficiently secured as in the case of the embodiment shown in FIG. 11.

Figure 14:
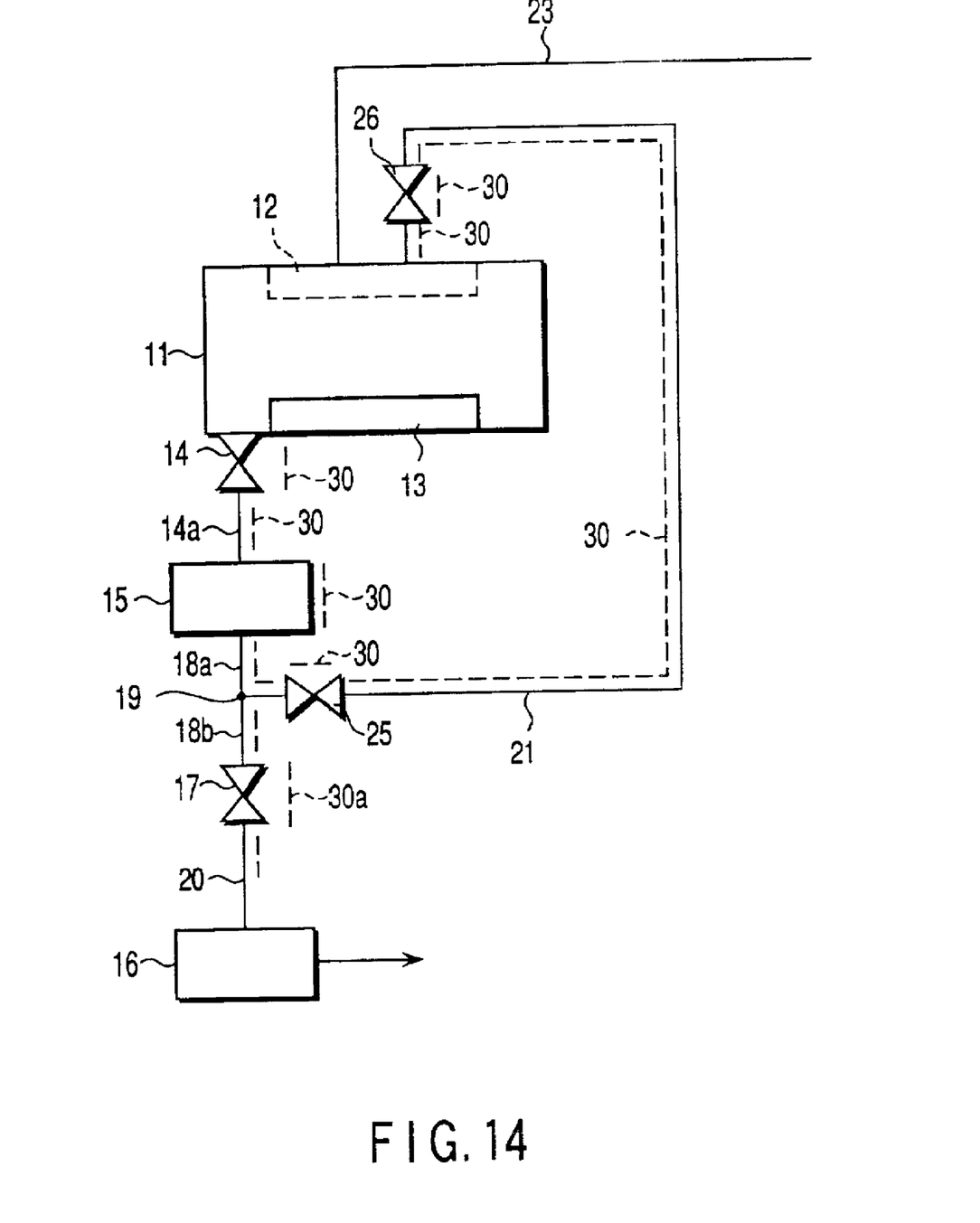
FIG. 14 is a diagram illustrating still another modified example of the gas circulating system according to a third embodiment of the present invention.

FIG. 14 is a diagram illustrating a modified example of the gas circulating systems shown in FIGS. 9, 11 and 12. The basic structure thereof is the same as that of the gas circulating system shown in FIG. 9 for instance. Therefore, the constituent components corresponding to the constituent components shown in FIG. 9 for instance are represented by the same reference numbers as those of FIG. 9 for instance, thereby omitting the detailed explanations thereof.

In the embodiment shown in FIG. 9, the gas circulating piping 21 is connected with the gas supply piping 23 at the confluence point 22, and the combined gas flow is permitted to be introduced via the gas feeding piping 24 into the chamber 11. Whereas, in this modified embodiment, these gas circulating piping 21 and gas supply piping 23 are individually connected with the chamber 11, and hence the processing gases from these gas circulating piping 21 and gas supply piping 23 are individually introduced into the chamber 11. The gas circulating piping 21 and gas supply piping 23 may be connected with different gas feeding piping which are independently connected with the chamber 11.

In this modified embodiment also, a heater 30 is provided so as to heat at least part of the circulating route (the route leading from the gas outlet portion of the chamber 11 to the gas feeding portion) as in the case of the embodiment shown in FIG. 9. Further, as in the case of the embodiment shown in FIG. 9, the components located outside the circulating route, i.e. the piping 18b, the back-pressure adjusting valve 17 and a portion of the piping 20 may be heated by a heater 30a.

By the way, although the embodiment shown in FIG. 14 sets forth a structure provided with the stop valves 25 and 26, these stop valves 25 and 26 may be omitted as in the case of the embodiment shown in FIG. 9, or only the stop valve 25 may be installed as in the case of the embodiment shown in FIG. 11. In the case where only the stop valve 25 is installed, even if only a portion of the circulating route located on the fore side of the stop valve 25 is heated by means of the heater 30, the effect of minimizing the generation of particles can be sufficiently secured as in the case of the embodiment shown in FIG. 11.

Furthermore, as a modified embodiment of the structure shown in FIG. 14, the structure which is additionally provided with the activating zone 31 as shown in FIG. 13 may be adopted. In this case, the gas circulating piping 21 and the gas supply piping 23 shown in FIG. 14 may be individually connected with this activating zone 31 so as to enable the processing gas activated in this activating zone 31 to be introduced into the chamber 11 as in the case of the embodiment shown in FIG. 13.

By the way, although the foregoing embodiments are directed to the film-forming process by means of plasma CVD method, the present invention is also applicable, in the same manner as explained above, to a cleaning process which will be performed after the film-forming process by means of plasma CVD method. For example, the present invention is applicable to a process wherein the active species of fluorine is generated by way of plasma so as to etch away tungsten, etc. that has been adhered onto the interior of the chamber in a cleaning process which will be performed after the deposition of tungsten film by means of thermal CVD method.

Furthermore, although the foregoing embodiments are directed to the cleaning process using a cleaning gas as the processing gas, the present invention is also applicable, in the same manner as described above, to an etching process using an etching gas as the processing gas. Moreover, the present invention is also applicable to a film-forming process using a film-forming gas as the processing gas.

Additional advantages and modifications will readily occur to those skilled in the art. Therefore, the invention is its broader aspects is not limited to the specific details and representative embodiments shown and described herein. Accordingly, various modifications may be made without departing from the spirit or scope of the general inventive concept as defined by the appended claims and their equivalents.

What is claimed is:

1. A gas-circulating processing apparatus which comprises:
    a processing chamber in which processing is performed;
    a gas supply piping communicated with a processing gas source;
    a first exhaust mechanism discharging a gas from said processing chamber;
    a second exhaust mechanism discharging a portion of the gas discharged from said first exhaust mechanism;
    a back pressure adjusting mechanism interposed between said first exhaust mechanism and said second exhaust mechanism to adjust a back pressure of said first exhaust mechanism;
    a gas circulating piping which is configured to combine another portion of the gas that has been discharged from said first exhaust mechanism with a processing gas supplied from said gas supply piping; and
    a gas feeding piping connected with a confluence zone where the processing gas from said gas supply piping is combined with the gas from said gas circulating piping to form a confluent gas, said gas feeding piping functioning to introduce said confluent gas into said processing chamber and having a larger inner diameter than that of said gas supply piping in the vicinity of said confluence zone thereby making it possible to improve the efficiency of gas circulation and to reduce the quantity of gas employed.

2. The gas-circulating processing apparatus according to claim 1, wherein the inner diameter of said gas feeding piping is at least 1.5 times as large as that of said gas supply piping.

3. The gas-circulating processing apparatus according to claim 1, wherein a conductance of said gas feeding piping is larger than that of said gas supply piping.

4. The gas-circulating processing apparatus according to claim 1, wherein the inner diameter of said gas circulating piping is larger than that of said gas supply piping in the vicinity of said confluence zone.

5. The gas-circulating processing apparatus according to claim 4, wherein the inner diameter of said gas circulating piping is at least 1.5 times as large as that of said gas supply piping.

6. The gas-circulating processing apparatus according to claim 4, wherein a conductance of said gas circulating piping is larger than that of said gas supply piping.

7. A gas-circulating processing apparatus which comprises:
    a processing chamber in which processing is performed by making use of an activated gas obtained by activating a processing gas;
    a gas feeding piping introducing said processing gas into said processing chamber;
    a first exhaust mechanism discharging a gas from said processing chamber;
    a first gas supply piping feeding said processing gas to said first exhaust mechanism;
    a second exhaust mechanism discharging a portion of the gas discharged from said first exhaust mechanism;
    a back pressure adjusting mechanism interposed between said first exhaust mechanism and said second exhaust mechanism to adjust a back pressure of said first exhaust mechanism; and
    a gas circulating piping connected with said gas feeding piping to feed the processing gas supplied from said first gas supply piping as well as another portion of the gas discharged from said first exhaust mechanism to said processing chamber through said gas feeding piping wherein the processing gas can be utilized as a purging gas for purging the gas discharged from the processing chamber in the first exhaust mechanism.

8. The gas-circulating processing apparatus according to claim 7, which further comprises a second gas supply piping connected with said gas feeding piping to feed said processing gas to said processing chamber, the processing gas from said first gas supply piping, part of the gas discharged from said first exhaust mechanism, and the processing gas from said second gas supply piping are introduced into said processing chamber.

9. The gas-circulating processing apparatus according to claim 8, wherein said first gas supply piping is branched from said second gas supply piping.

10. A gas-circulating processing method comprising feeding a processing gas to a gas-circulating processing apparatus which comprises:
    a processing chamber in which processing is performed by making use of an activated gas obtained by activating a processing gas;
    a gas feeding piping introducing said processing gas into said processing chamber;
    a first exhaust mechanism discharging a gas from said processing chamber;
    a second exhaust mechanism discharging a portion of the gas discharged from said first exhaust mechanism;
    a back pressure adjusting mechanism interposed between said first exhaust mechanism and said second exhaust mechanism to adjust a back pressure of said first exhaust mechanism; and
    a gas circulating piping connected with said gas feeding piping to feed another portion of the gas discharged from said first exhaust mechanism to said processing chamber through said gas feeding piping,
    wherein said processing gas is supplied to said first exhaust mechanism, thereby purging the gas in said first exhaust mechanism, and parts of the processing gas and the purged gas are introduced into said processing chamber through said gas circulating piping and said gas feeding piping thereby making it possible to enhance the efficiency of a predetermined processing such as the cleaning of the aparatus.

11. The method according to claim 10, wherein said gas-circulating processing apparatus further comprises a gas supply piping connected with said gas feeding piping to feed said processing gas to said processing chamber, and the processing gas from said gas supply piping is introduced into said processing chamber through said gas feeding piping, and the parts of the processing gas and the purged gas in said first exhaust mechanism are introduced into said processing chamber through said gas circulating piping and said gas feeding piping.

12. The method according to claim 10, wherein said processing chamber is a film-forming chamber of CVD apparatus and said processing is film forming.

13. The method according to claim 10, wherein said processing chamber is a film-forming chamber of CVD apparatus and said processing is cleaning in said film-forming chamber.

14. The gas-circulating processing method according to claim 10, wherein said processing chamber is an etching chamber of etching apparatus and said processing is etching.

15. A gas-circulating processing apparatus which comprises:

a processing chamber in which processing is performed;

a first exhaust mechanism discharging a gas from said processing chamber;

a second exhaust mechanism discharging a portion of the gas discharged from said first exhaust mechanism through an exhaust piping interposed therebetween;

a back pressure adjusting mechanism interposed between said first exhaust mechanism and said second exhaust mechanism to adjust a back pressure of said first exhaust mechanism;

a gas circulating piping feeding another portion of the gas discharged from said first exhaust mechanism to said processing chamber; and a first heater heating at least part of a circulating route extending from said processing chamber through said first exhaust mechanism and said gas circulating piping to said processing chamber thereby making it possible to effectively remove contaminants that might adhere to an inner wall of the gas circulating pipe.

16. The gas-circulating processing apparatus according to claim 15, wherein at least part of said circulating route is heated by means of said first heater to a temperature of not lower than 60° C.

17. The gas-circulating processing apparatus according to claim 15, wherein at least part of said circulating route is heated by means of said first heater to a temperature of not higher than 100° C.

18. The gas-circulating processing apparatus according to claim 15, which further comprises a second heater heating said back pressure adjusting mechanism and said exhaust piping, thereby making it possible to effectively remove contaminants that might adhere to an inner wall of the back pressure adjusting mechanism and the exhaust piping.

19. The gas-circulating processing apparatus according to claim 15, which further comprises a first valve at a portion of said circulating piping, which is located in the vicinity of a position where said exhaust piping is branched.

20. The gas-circulating processing apparatus according to claim 15, which further comprises a second valve at a portion of said circulating piping, which is located on the downstream side of said first valve.

* * * * *